United States Patent [19]

Kimura

[11] 4,426,694

[45] Jan. 17, 1984

[54] BEAM POSITION DETECTING DEVICE FOR OPTICAL DISC APPARATUS

[75] Inventor: Kenji Kimura, Tachikawa, Japan

[73] Assignees: Olympus Optical Co. Ltd., Tokyo, Japan

[21] Appl. No.: 301,195

[22] Filed: Sep. 11, 1981

[30] Foreign Application Priority Data

Sep. 17, 1980 [JP] Japan .................... 55-128883

[51] Int. Cl.³ .................... G11B 7/00; G11B 21/10
[52] U.S. Cl. .................... 369/46; 250/202
[58] Field of Search .................... 250/202; 369/44, 45, 369/46, 54, 111, 120; 365/215, 234, 235

[56] References Cited

U.S. PATENT DOCUMENTS

| | | | |
|---|---|---|---|
| 4,144,542 | 3/1979 | Preuss .................... | 369/45 X |
| 4,224,480 | 9/1980 | Satoh et al. .................... | 369/44 X |
| 4,290,122 | 9/1981 | Bates et al. .................... | 365/234 |
| 4,321,622 | 3/1982 | Jerome et al. .................... | 369/46 X |
| 4,363,116 | 12/1982 | Kleuters et al. .................... | 369/45 X |

OTHER PUBLICATIONS

Lean, "GaAs Laser Array and Fiber-Optic Detector Array for Disc Appliction", IBM Tech. Disc. Bul., vol. 23, No. 7A, Dec. 1980, pp. 2992, 2993.

*Primary Examiner*—Stuart N. Hecker
*Assistant Examiner*—Donald McElheny, Jr.
*Attorney, Agent, or Firm*—Frishauf, Holtz, Goodman and Woodward

[57] ABSTRACT

A laser beam, while moving in a radial direction of a rotating optical disc, illuminates the surface of the rotating optical disc and a portion of the laser beam reflected on the surface of the optical disc is directed to a fixed photosensor. The photosensor includes a plurality of photoelectric elements arranged along the radial direction of the disc. The fixed photoelectric elements thus receive the portion of the reflected laser beam as the beam moves in the radial direction of the optical disc, and produce corresponding photoelectric signals. The photoelectric signals are read out in a time series and converted to sampling pulse signals. A sawtooth signal is generated and sampled by the sampling pulse signals. A difference detector detects the difference between a sampled signal component of the sawtooth signal and a reference voltage to determine the beam position based on the detected difference.

9 Claims, 7 Drawing Figures

BEAM POSITION DETECTING DEVICE FOR OPTICAL DISC APPARATUS

BACKGROUND OF THE INVENTION

This invention relates to a beam position detecting device for optical disc apparatus.

An optical disc apparatus causes, for example, a laser beam from a laser beam source to illuminate a rotating optical disc, while moving in a radial direction of the optical disc, whereby the recording and reading of information on and out of the optical disc are performed. For example, an optical video disc player is known as such optical disc apparatus. With the optical video disc player a so-called random access system is adopted in which track information, i.e. desired frame information, recorded on the disc is reproduced by the laser beam moving in the radial direction. In order to perform a random access operation it is necessary to detect a laser beam spot position on a disc. In order to detect the beam spot position a light beam device provided with a laser, objective lens, reflection mirror etc. includes an electrical or a mechanical displacement measuring device such as a slide type resistor, magnetic sensor (magnetic scale) etc. In the optical video disc player having a random access function in particular, a laser beam is frequently moved for track searching, causing greater wear of the mechanical section of the displacement measuring device and incurring a durability problem for the disc player. In order to obtain a short access time it is necessary to make the movable section much lighter. Moreover, it is also necessary to make the load of the sensor section for position detection as small as possible. With the above-mentioned detection device it would be difficult to satisfy such requirements. It is known to use a linear encoder for detecting moire fringes. Such an arrangement is, however, complicated and expensive and requires a complicated adjustment.

SUMMARY OF THE INVENTION

It is accordingly an object of this invention to provide a system for detecting the beam position of an optical disc, which includes a sensor a noncontact type so as to be free from any mechanical load and is simpler in arrangement, higher in accuracy and lower in cost.

According to this invention a light beam emitted from a light beam source illuminates the surface of a rotating optical disc as a spot beam, and the recording and reproduction of information on and from the optical disc are performed, while the beam spot is moved in the radial direction of the optical disc. A portion of the beam is extracted by a beam splitter element and illuminates a photosensor comprised of a plurality of photoelectric converting elements arranged in a line. The information of the photoelectric converting elements are sequentially read out along one direction of the line type photosensor to provide serial signals. The beam position on the optical disc is detected by the serial signals.

DETAILED DESCRIPTION OF THE PREFERRED EMBODIMENT

Figure 1:
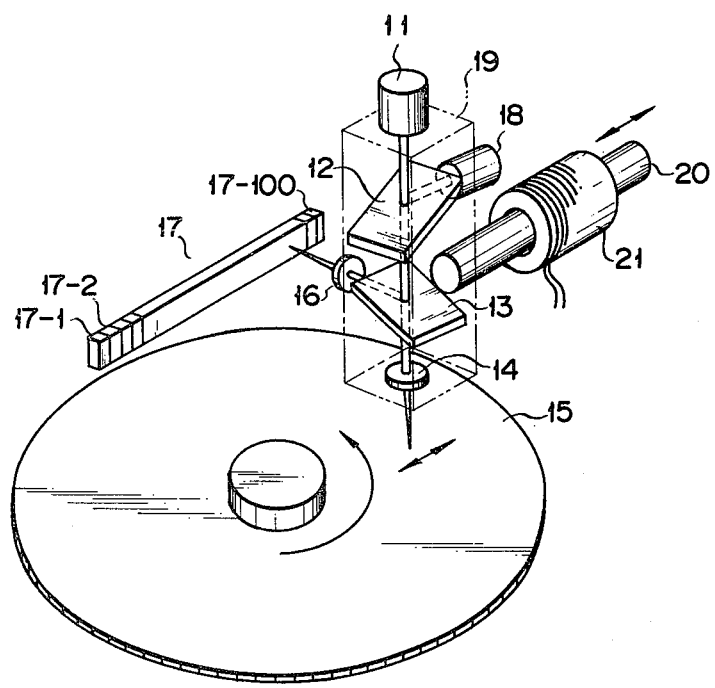
FIG. 1 is a perspective view showing an optical disc apparatus using a beam position detecting device.

In an embodiment as shown in FIG. 1 a laser beam emitted from a laser beam source 11, while passing through half-mirrors 12 and 13, falls on an objective lens 14 whereby the laser beam is focused onto the surface of a rotating disc 15. The laser beam is reflected on the surface of the rotating disc 15. At this time, the laser beam is modulated by information recorded on the rotating disc 15. A reflected beam i.e. a modulated beam is obtained through its reflection on the surface of the disc 15. The modulated beam is incident to the half-mirror 13, some of it being reflected and directed toward the lens 16 and the rest of it passing through the half-mirror. The half-mirror 13 functions as a beam splitter and splits the beam into two portions. That portion of the beam reaching the lens 16 is focused onto a photosensor 17. The photosensor 17 is comprised of a plurality of photoreceptor elements, for example, 100 photodiodes 17-1 to 17-100, arranged in a radial direction of the disc 15 i.e. in a direction of movement of the laser beam which illuminates the disc 15. The rest of the beam passing through the half-mirror 13 is incident to the photosensor 18 through a half-mirror 12. The photosensor 18 causes the modulated beam corresponding to bit information stored in the disc 15 to be photoelectrically converted to a video signal.

The laser beam source 11, half-mirror 12, half-mirror 13, objective lens 14 and lens 16 are supported on a holding member 19 by a well known method. A magnet bar 20 inserted through a moving coil 21 is connected to the holding member 19. The magnet bar 20 is moved radially of the disc 15 according to an electric current supplied to the moving coil 21. The holding member 19 is moved radially of the disc 15 in interlock with the movement of the magnet bar 20.

Figure 2:
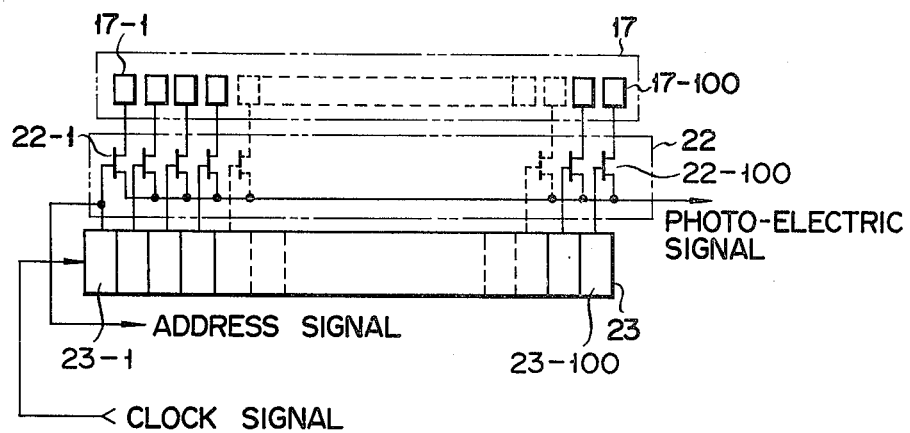
FIG. 2 is a circuit diagram showing one form of a photosensor as shown in FIG. 1.

The photodiodes 17-1, . . . , 17-100 of a line type photosensor 17 as shown in FIG. 2 are connected to field effect transistors (FET's) 22-1, . . . , 22-100, respectively, which constitute a switch circuit 22. Bit stages 23-1, . . . , 23-100 of a 100 bit shift register 23 are connected to the gates of the FET's 22-1, . . . , 22-100, respectively. The shift register 23 is shift-operated in response to a clock signal from a clock generator 25 i.e. a clock signal of a frequency of, for example, 10 kHz. By the shift operation of the shift register, bit signals are sequentially outputted from the bit stages 23-1 to 23-100 in the shift register 23, causing the FET's 22-1, . . . , 22-100 to be sequentially turned ON. When this is done, output signals are sequentially read out of photodiodes 17-1, . . . , 17-100 in the photosensor 17. At this time, a signal on the first stage 23-1 of the shift register 23 is used as an initial address signal.

Figure 4:
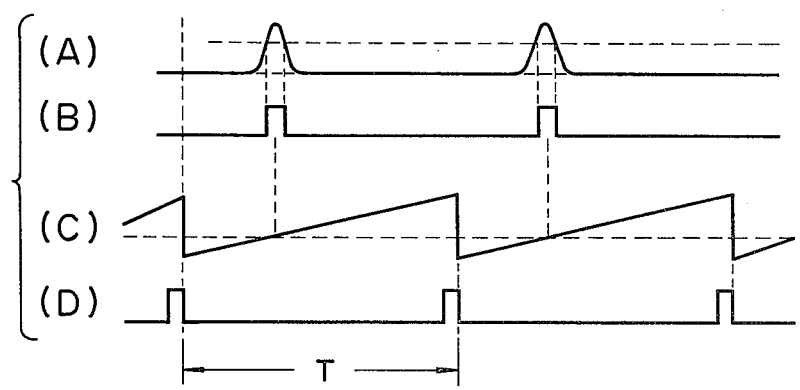
FIG. 4, consisting of A–D, is a time chart for explaining an operation of each part of the block diagram shown in FIG. 3.
Figure 3:
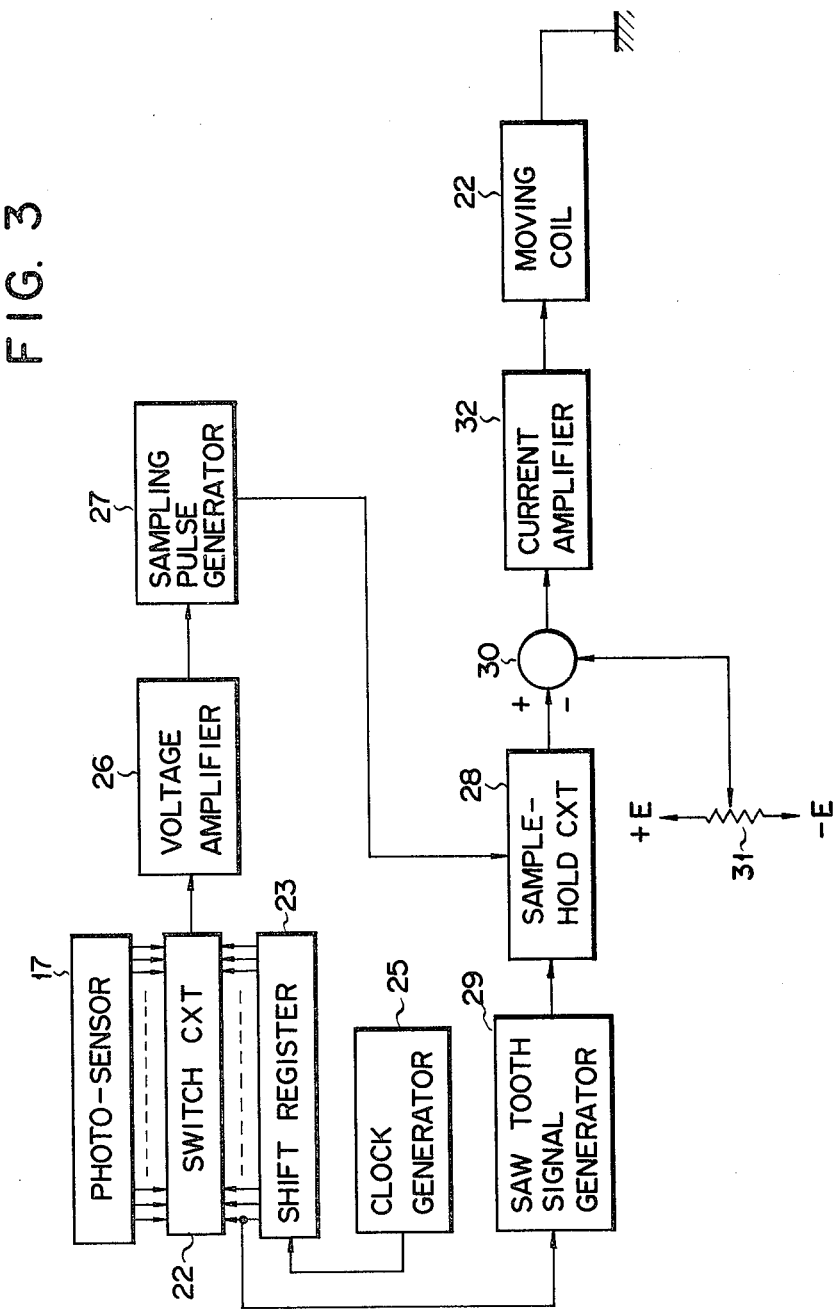
FIG. 3 is a block diagram showing the beam position detecting device of this invention.

As shown in FIG. 3, bit signals sequentially read out of the photosensor 17 are amplified by a voltage amplifier 26 and supplied as signals A (FIG. 4) to a sampling pulse generator 27 where they are shaped by the threshold level as indicated by dotted lines. Sampling pulse signals B are generated from the sampling pulse generator 27. Since the output level of the photosensor 17 varies dependent upon a variation of the reflectivity of the disc 15 or a variation of the light emission strength of the beam source, the threshold level is set to a substantially intermediate value between the average of the output levels when a laser beam is not illuminated and the average of the output levels when a laser beam is illuminated. If the threshold level is set in this way, it is possible to effectively prevent a variation in the level of the output of the sampling pulse generator 27.

When an initial address signal D from the shift register 23 of FIG. 3 is supplied to a sawtooth signal generator 29, the sawtooth signal generator 29 is triggered to produce a sawtooth signal C. A width T of the sawtooth signal corresponds to one scanning line of the photosensor 17. The sawtooth signal C is supplied, together with the sampling pulse signal B, to a sample-hold circuit 28. The sample-hold circuit 28 samples the components of a sawtooth signal of the same phase as the sampling pulse signal B. The sampling pulse signal B undergoes a phase variation with respect to the address signal D in accordance with the movement of the position of an incident laser beam spot, and thus the sawtooth signal component sampled in synchronism with the sampling pulse signal B corresponds to the position of the laser beam spot. As a result, the laser beam spot can be detected by the level of the sawtooth signal component. The sawtooth signal component sampled by the sample-hold circuit 28 is supplied to a positive input terminal of a difference detector 30. A reference voltage obtained by a potentiometer 31 is applied to a negative input terminal of the difference detector 30. The reference voltage is set to a desired level by the readout position of the disc 15. The difference detector 30 compares the level of the reference voltage with the voltage level of the sawtooth signal component to produce a signal corresponding to the difference between both the signal levels. The output signal of the difference detector 30 is amplified by a current amplifier 32 and supplied to a moving coil 21. The moving coil 21 causes the magnet bar 20 to be moved in accordance with the polarity and magnitude of the input signal, causing the holding member 19 to be moved to permit the laser beam to be moved in the radial direction of the disc 15. When the laser beam is so moved, the phase of the sampling pulse signal B leads with respect to the phase of the address signal D. As a result, the output level of the difference detector 30 varies, causing current being supplied to the moving coil 21 to become larger to permit the magnet bar 20 to be further moved. That is, the beam position detecting device performs a feedback operation. If, therefore, the beam position detecting device performs a negative feedback operation, the laser beam spot can be moved to a designated position in the radial direction of the disc 15 in such a manner as to follow the reference potential set by the potentiometer 31. In the circuit as shown in FIG. 3, for example, a compensating circuit for compensating for a phase delay resulting from a negative feedback is omitted.

According to this invention the photosensor comprised of a plurality of photoreceptor elements arranged in the radial direction of the disc generates signals in a time series in response to the beam spot moving on the surface of the disc in the radial direction and thus the beam position detecting device for optical disc apparatus detects the position of the beam spot based on the signals. With a simpler arrangement and high accuracy the device of this invention can detect the beam position without receiving any mechanical stress.

Although in the above-mentioned embodiment the device of this invention is applied to an optical video disc player, it can also be applied to an optical video disc recorder or a photo-magnetic disc video player or recorder. Likewise, the device of this invention can be applied to not only a video disc player or recorder and audio disc player or recorder, but also a data memory for recording and reproducing various data. While in the above-mentioned embodiment use is made of a photosensor comprised of photodiodes, it is possible to employ a sensor using elements such as a CCD (charged coupled device).

What is claimed is:

1. A beam position detecting device for an optical disc apparatus which records and reads information on and out of an optical disc by radiating a light beam from a moveable optical head onto the optical disc, comprising:
    a photosensor supported at a fixed position spaced apart from the optical head and including a plurality of photoelectric elements arranged in a line in the radial direction of the optical disc;
    a beam splitter integrally formed with the optical head for splitting a light beam reflected from the optical disc and directing a portion of the reflected light beam toward said photosensor;
    means for driving said beam splitter together with the optical head and in the radial direction of the optical disc, wherein said photosensor is scanned by the portion of the reflected light beam from said beam splitter so that the photoelectric elements of said photosensor sequentially produce photoelectric signals;
    readout means for sequentially reading out the photoelectric signals from said photosensor and for producing an initial address signal; and
    light beam position detecting means coupled to said readout means and including a sampling pulse signal generator for generating sampling pulse signals in response to the photoelectric signals, a sawtooth signal generator for generating a sawtooth signal in synchronism with the initial address signal of said readout means, means for sampling the sawtooth signal from the sawtooth signal generator in response to the sampling pulse signals from said sampling pulse signal generator and for producing a corresponding sawtooth signal component, and judging means for determining the position of the light beam in accordance with the sawtooth signal component.

2. A beam position detecting device according to claim 1, wherein said readout means comprises a switch circuit including switch elements connected to said photoelectric elements in said photosensor and a shift register for sequentially inputting trigger signals into the switch elements in the switch circuit.

3. A beam position detecting device according to claim 1, wherein said judging means is comprised of means for detecting a difference between the sawtooth signal component and the reference component and for determining the beam position by the difference.

4. A beam position detecting device according to claim 1, wherein said photoelectric elements are photodiodes.

5. A beam position detecting device according to claim 1, wherein the photosensor is a charge coupled device.

6. A beam position detecting device according to claim 1, wherein said light beam is a laser beam.

7. A beam position detecting device according to claim 2, wherein said photoelectric elements are photodiodes.

8. A beam position detecting device according to claim 2, wherein the photosensor is a charge coupled device.

9. A beam position detecting device according to claim 2, wherein said light beam is a laser beam.

* * * * *